Patented Aug. 15, 1944

2,355,654

UNITED STATES PATENT OFFICE 2,355,654

DYESTUFFS FOR USE IN PHOTOGRAPHY

John David Kendall and Douglas James Fry, Ilford, England, assignors to Ilford Limited, Ilford, England, a British company No Drawing. Application August 21, 1941, Serial No. 407,840. In Great Britain October 16, 1940

8 Claims. (Cl. 260—240)

This invention relates to the manufacture and use of photographic sensitising dyestuffs.

In our application No. 407,839 filed on August 21, 1941, processes are described for the production of dyestuffs of the general formula:

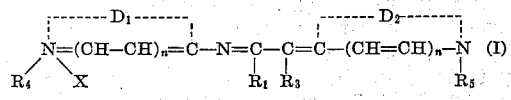

and of the general formula:

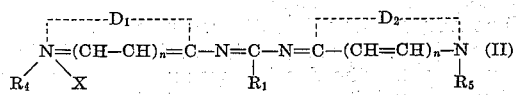

where $D_1$ and $D_2$ are the residues of heterocyclic nuclei, $R_1$ is an alkyl, aralkyl or aryl group, $R_3$ is hydrogen or an alkyl, aryl or aralkyl group, $R_4$ and $R_5$ are alkyl or aralkyl groups, X is an acid residue and $n$ is nought or 1.

According to the present invention, valuable photographic sensitising dyes are prepared by condensing a compound of the general formula (I) or (II) above where $R_1$ is a —$CH_2R_2$ group and $R_2$ is hydrogen or an alkyl, aryl or aralkyl group, with an alkyl or aralkyl quaternary salt of a heterocyclic nitrogen compound containing either a reactive thioether or selenoether group (including an aryl-, alkyl- or aralkyl thioether or selenoether group) or a —(CH=CH)$_m$NH$_2$ group where $m$ is 1, 2 or 3 (including N-acyl, N-aryl and N-acylaryl groups of this type) in the α- or γ-position to the quaternary nitrogen atom. The grouping —(CH=CH)$_m$NH$_2$ is hereinafter referred to as the aminovinyl type of group.

The course of the reaction underlying the process of this invention may be set out as follows:

(In these formulae, $D_1$, $D_2$, $R_2$, $R_3$, $R_4$, $R_5$, X and $n$ have the meanings assigned to them above, $D_3$ is a residue of a heterocyclic nucleus, $R_6$ is an alkyl or aralkyl group and $x$ is 1, 2 and 3).

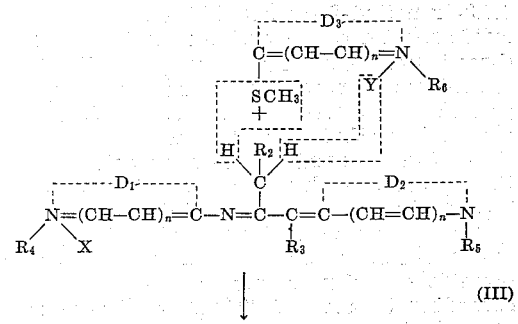

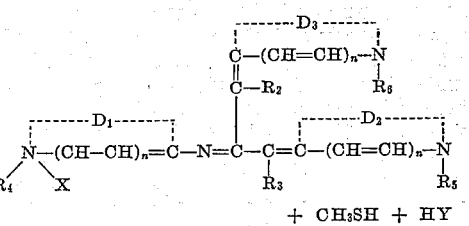

+ CH$_3$SH + HY

If, instead of a thio-ether type of group, the said heterocyclic nitrogen compound contains a reactive aminovinyl type of group, the product differs from that shown in general formula (III) above by the addition of one or more pairs of methine groups between the added nucleus and the

grouping of the residue of the initial compound, i. e. it has the following formula:

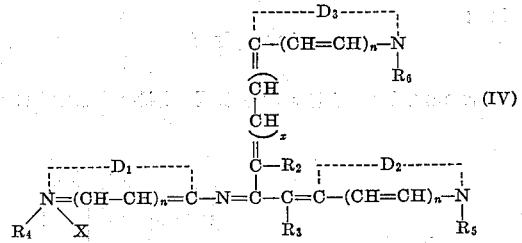

It will be appreciated that the formula of the products may not be precisely that of the general formulae (III) and (IV) since the acid residue may wander to any one of the nitrogen atoms, making that nitrogen atom quaternary, with a consequent shift in the single and double linkages. Also, instead of the acid HY, the acid HX may be removed during the condensation depending on the nature of the acid residues. It is to be understood therefore that the products of the process of this invention may have a formula not identical with Formula III or IV but one that is tautomeric therewith.

As indicated above, in the foregoing formulae the groups $D_1$, $D_2$ and $D_3$ are the residues of heterocyclic nuclei. Examples of suitable heterocyclic nuclei are: substituted or unsubstituted thiazoles, thiazolines, oxazoles, oxazolines, selenazoles, selenazolines, pyridine, quinoline, indolenine, diazines (e. g. pyrimidine) thio-diazoles and quinazoline and the corresponding substituted or unsubstituted polycyclic compounds such as benzthiazoles, naphthathiazoles and anthrathiazoles and also the diazines described in British Patent No. 425,609.

The groups $R_1$, $R_2$, $R_3$, $R_4$, $R_5$ and $R_6$ may be alkyl or aralkyl groups; examples are methyl, ethyl, propyl, butyl and higher alkyl groups, and benzyl and naphthyl-methyl groups. The groups $R_2$ and $R_3$ may be aryl groups and examples are phenyl and naphthyl groups. Such aryl groups may themselves be substituted, e. g. by alkyl, amino, hydroxy, alkoxy and oxyalkyl groups and by halogen atoms. The group $R_3$ may be a hydrogen atom.

As already indicated the process of this invention consists in a reaction between two quaternary salts. The salt groups may be the same or different and may be, for example, chloride, bromide, iodide, sulphate or perchlorate groups. Preferably, however, the reacting quaternary salts are alkyl or aralkyl-p-toluene sulphonates, e. g. ethyl or methyl-p-toluene sulphonate.

In carrying out the process of the invention it is not necessary to isolate the quaternary salts of the two reactants. Thus, by condensing a compound of general formula (I) or (II) with a heterocyclic nitrogen base containing the said reactive thioether, seleno-ether or aminovinyl group, together with sufficient alkyl or aralkyl salt to convert the heterocyclic nitrogen base to a quaternary salt, the reaction may be effected in one stage. A particularly convenient process is to employ an alkyl or aralkyl-p-toluene sulphonate and to effect the reaction by fusing together the compound of formula (I) or (II) the heterocyclic nitrogen base containing the specified reactive group and a sufficiency of alkyl or aralkyl-p-toluene sulphonate, to convert the base to the quaternary salt.

Preferably, the condensation process of this invention is completed in the presence of an acid binding agent, e. g. pyridine, piperidine, triethylamine, sodium acetate or sodium carbonate.

The following examples illustrate the invention:

*Example I*

Preparation of the dyestuff of the formula:

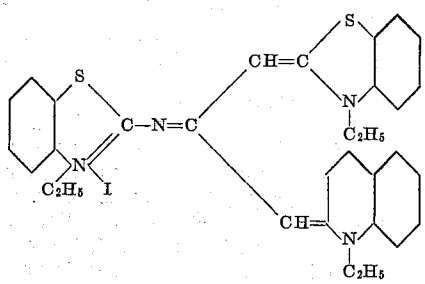

A mixture of 1 gm. of 2.2'-diethyl-8-methyl-7-az-trimethine-thiacyanine iodide, 0.8 gm. of ethyl-p-toluene sulphonate and 0.35 gm. of methylthiolquinoline, was fused for three hours at 130–140° C. 20 ccs. of pyridine were then added and the mixture was refluxed for half-an-hour and then poured into potassium iodide solution. The solution obtained was diluted with water whereupon a reddish-brown solid precipitated out. The precipitate was separated by filtration and on recrystallisation from methyl alcohol it yielded the desired dyestuff, having a melting point of 279° C.

This dyestuff when incorporated in a gelatino silver chloride photographic emulsion imparts a band of sensitivity extending from 4400A to 6200A with maxima at about 5000A and 5800A. Incorporated in a gelatino silver iodobromide emulsion it imparts a band of sensitivity extending to about 6400A with maxima at about 5900A and 6200A.

*Example II*

Preparation of the dyestuff of the formula:

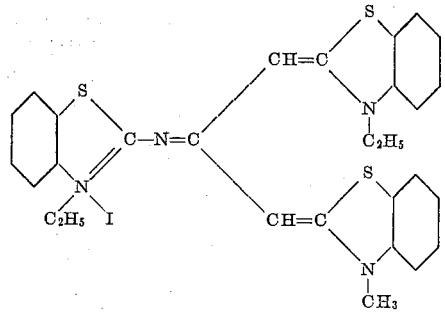

A mixture of 1 gm. of 2.2'-diethyl-8-methyl-7-az-trimethine-thiacyanine iodide, 0.35 gm. of methylthiol-benzthiazole and 2.4 gms. of methyl-p-toluene sulphonate was fused for three hours at 120–130° C. 50 ccs. of pyridine were then added and the mixture boiled for half-an-hour. The mixture was then poured into potassium iodide solution whereupon the desired dyestuff separated out. The dyestuff was removed by filtration, re-crystallised from methyl alcohol and thus obtained as a reddish-brown powder melting at 270° C.

This dyestuff when incorporated in a gelatino silver iodobromide photographic emulsion imparts a band of sensitivity extending to about 6400A with maxima at about 5900A and 6200A.

*Example III*

Preparation of the dyestuff of the formula:

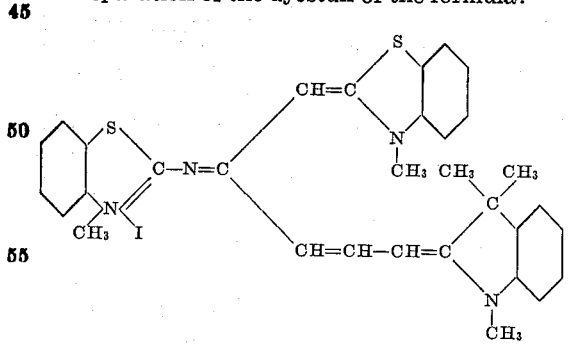

A mixture of 1 gm. of 2.2'-dimethyl-8-methyl-7-az-trimethine-thiacyanine iodide, 0.9 gm. of 1.3.3-trimethyl-2-ω-acetanilido-vinyl-indolenium iodide and 100 ccs. of pyridine was boiled for over three hours. The solution was then filtered, and the filtrate evaporated to dryness under reduced pressure. The residue was then dissolved in 200 ccs. of hot ethyl alcohol, concentrated to one-third of its bulk and filtered while hot. The solution was then further concentrated to a volume of 20 ccs. whereupon the desired dyestuff separated as bronze crystals, melting at 228° C. This dyestuff when incorporated in a gelatino silver iodobromide emulsion imparts a band of sensitivity extending to about 7000A with a maximum at about 6600A.

Example IV

Preparation of the dyestuff of the formula:

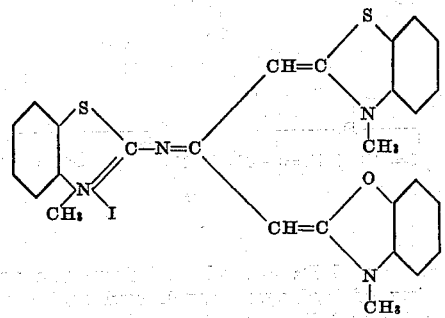

A mixture of 1 gm. of 2.2'-dimethyl-8-methyl-7-az-trimethine-thiacyanine iodide, 0.3 gm. of methylthiol-benzoxazole and 2.4 gms. of methyl-p-toluene sulphonate was fused for four hours at 140° C. 50 ccs. of pyridine were then added and the mixture boiled for half-an-hour and then poured into potassium iodide solution. The solution was then diluted whereupon the dyestuff separated out. The dyestuff was separated by filtration, boiled out with methyl alcohol and thus obtained as a brown dye melting at 248° C. This dyestuff when incorporated in a gelatino silver iodobromide emulsion imparts a band of sensitivity extending to 6200A with a maximum at about 5800A.

Example V

Preparation of the dyestuff of the formula:

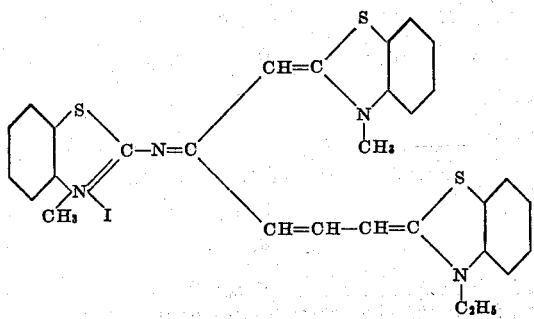

A mixture of 1 gm. of 2.2'-dimethyl-8-methyl-7-az-trimethine-thiacyanine iodide, 0.9 gm. of 1-ω-acetanilido-vinyl-benzthiazole ethiodide and 150 ccs. of pyridine was boiled for two hours when the bright green colour which developed began to fade to olive green. The solution was then filtered and the filtrate evaporated to dryness under reduced pressure. The residue was then disolved in 100 ccs. of hot ethyl alcohol, cooled and filtered. The filtrate was evaporated whereupon the dyestuff crystallised out as dark green solid melting at 178° C. This dyestuff when incorporated in a gelatino silver iodide bromide emulsion imparts a band of sensitivity with a maximum at about 6800A.

Example VI

Preparation of the dyestuff of the formula:

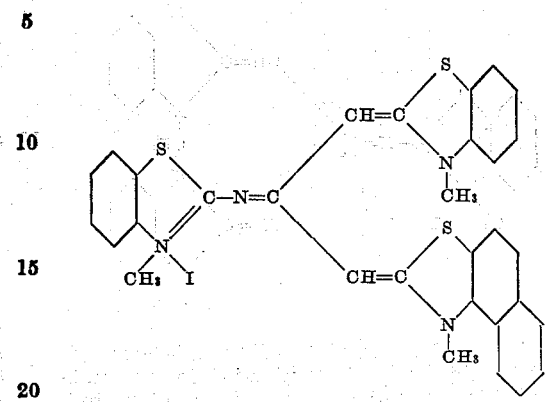

A mixture of 1 gm. of 2.2'-dimethyl-8-methyl-7-az-trimethine-thiacyanine iodide, 0.45 gm. of 2.2'-mercapto-3:4-naphthathiazole and 2.4 gms. of methyl-p-toluene sulphonate was fused for four hours at 160° C. 50 ccs. of pyridine were then added and the mixture poured into potassium iodide and the solution then filtered. The filtrate was diluted whereupon the dyestuff separated. On recrystallisation from methyl alcohol the product was obtained as dark brown powder melting at 176° C. This dyestuff when incorporated in a gelatino silver iodide bromide emulsion imparts a band of sensitivity extending to 6000A with maxima at about 5400A and 5900A.

Example VII

Preparation of the dyestuff of the formula:

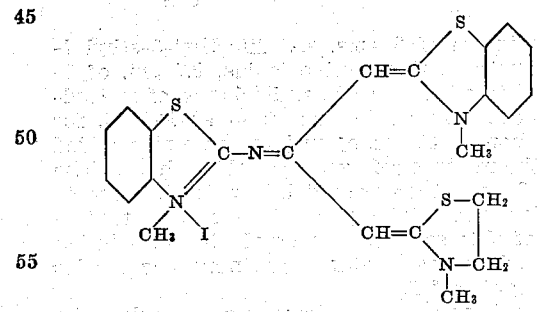

A mixture of 1 gm. of 2.2'-dimethyl-8-methyl-7-az-trimethine thiacyanine iodide, 0.2 gm. of 2-methyl-thiol-thiazoline and 2 gms. of methyl-p-toluene sulphonate was fused for 3 hours at 140–150° C. The mixture was then cooled, 30 ccs. of pyridine were added and the mixture was boiled for one hour and then poured into potassium iodide solution and diluted with water. The dyestuff separated out, was filtered off and washed with ethyl alcohol and ether. It was obtained as small cholocate coloured crystals, melting at 278° C. This dyestuff when incorporated in a gelatino silver iodo bromide emulsion imparts a band of sensitivity extending to 6400A with a maximum at 5900A.

Example VIII

Preparation of the dyestuff of the formula:

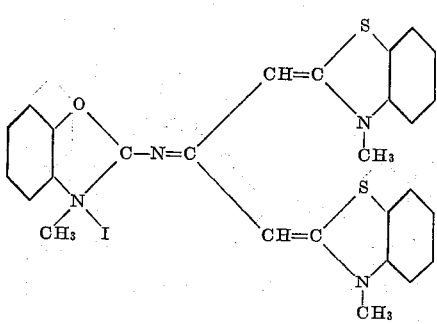

A mixture of 2 gms. of 2.2'-dimethyl-8-methyl-7-az-trimethine oxathiacyanine iodide, 0.7 gm. 1-methyl-thiol-benzthiazole and 1.5 gms. of methyl-p-toluene sulphonate was fused for three hours at 140° C. 20 ccs. of pyridine was then added and the mixture refluxed for half an hour. The mixture was then poured into potassium iodide solution and the product separated out. It was obtained as red crystals melting at 257° C.

Example IX

Preparation of the dyestuff of the formula:

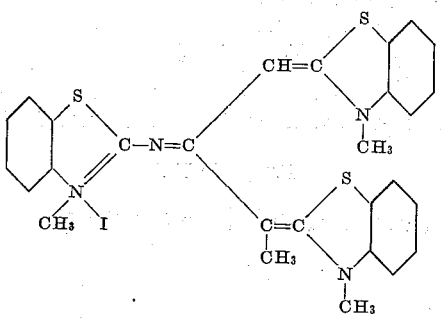

A mixture of 2 gms. 2.2'-dimethyl-8-ethyl-7-az-trimethine thiacyanine iodide, 0.7 gm. of 1-methyl thiolbenzthiazole and 1.5 gms. of methyl-p-toluene sulphonate was fused at 140° C. for three hours. 30 ccs. of pyridine were then added and the mixture refluxed for half an hour. The mixture was then poured into potassium iodide solution and solid separated. On recrystallisation of this solid from methyl alcohol solution the product was obtained as shining blue needles melting at 252° C.

As indicated in the foregoing examples, the dyestuffs of this invention are very valuable sensitisers for photographic gelatino-silver halide emulsions, e. g. silver chloride, silver bromide, silver chlorobromide and silver iodobromide emulsions.

In the following claims, the expression "thio-ether group," "seleno-ether group" and "amino-vinyl group" have been used for the sake of briefness but it is to be understood that the first two of these expressions include the corresponding aryl-, alkyl- and aralkyl-thioether and -selenoether groups and that the third expression includes groups of the formula $-(CH=CH)_m.NH_2$ (where $m$ is 1, 2 or 3) and includes N-acyl, N-aryl and N-acylaryl substituted groups of this type.

What we claim is:

1. Process for the production of dyestuffs which comprises condensing a compound selected from the group consisting of compounds of the general formula:

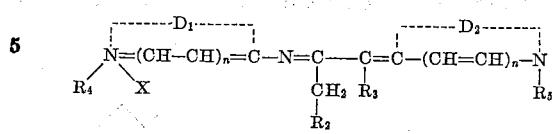

and

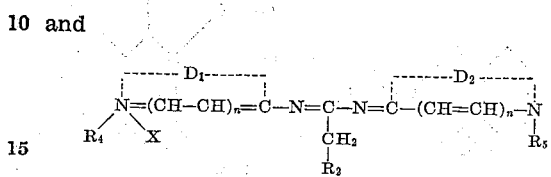

(where $R_2$ and $R_3$ are selected from the group consisting of hydrogen, alkyl, aryl and aralkyl groups, $R_4$ and $R_5$ are selected from the group consisting of alkyl and aralkyl groups, X is an acid residue, $n$ is selected from the group consisting of nought and one and $D_1$ and $D_2$ are residues of heterocyclic nitrogen nuclei of the type used in cyanine dyes) with a second quaternary salt of a heterocyclic nitrogen compound of the type used in cyanine dyes containing a reactive group selected from the group consisting of the reactive thioether, selenoether and aminovinyl types of group in a position relative to the heterocyclic nitrogen atom selected from the group consisting of the α and γ positions.

2. Process according to claim 1 wherein the second quaternary salt contains a $CH_3S-$ group in a position selected from the group consisting of the α and γ positions to the heterocyclic nitrogen atom.

3. Process for the production of dyestuffs which comprises condensing a compound selected from the group consisting of compounds of the general formula:

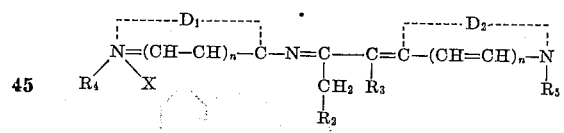

and

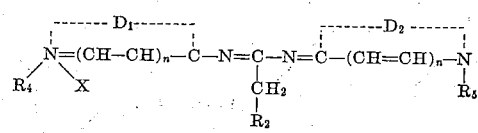

(where $R_2$ and $R_3$ are selected from the group consisting of hydrogen, alkyl, aryl and aralkyl groups, $R_4$ and $R_5$ are selected from the group consisting of alkyl and aralkyl groups, X is an acid residue, $n$ is selected from the group consisting of nought and one and $D_1$ and $D_2$ are residues of heterocyclic nitrogen nuclei of the type used in cyanine dyes) with a heterocyclic nitrogen compound of the type used in cyanine dyes containing a reactive group selected from the group consisting of the reactive thioether, selenoether and amino vinyl types of group in a position relative to the heterocyclic nitrogen atom selected from the group consisting of the α and γ positions, in the presence of a sufficiency of a salt selected from the group consisting of alkyl and aralkyl salts to convert the said compound to a quaternary salt.

4. Process according to claim 3 wherein the salt employed is an alkyl-p-toluene sulphonate.

5. Dyestuffs of the general formula:

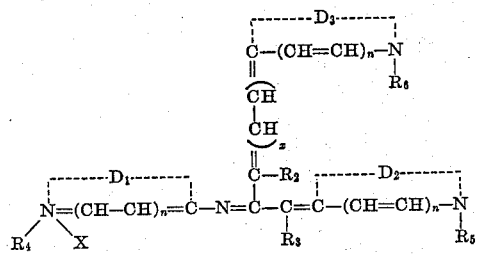

where $R_2$ and $R_3$ are selected from the group consisting of hydrogen, alkyl, aryl and aralkyl groups, $R_4$, $R_5$ and $R_6$ are selected from the group consisting of alkyl and aralkyl groups, X is an acid residue, $n$ is selected from the group consisting of nought and one, $x$ is selected from the group consisting of 0, 1, 2 and 3 and $D_1$, $D_2$ and $D_3$ are residues of heterocyclic nitrogen nuclei of the type used in cyanine dyes.

6. Dyestuffs of the general formula:

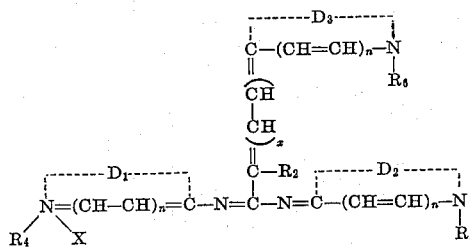

where $R_2$ is selected from the group consisting of hydrogen, alkyl, aryl and aralkyl groups, $R_4$, $R_5$ and $R_6$ are selected from the group consisting of alkyl and aralkyl groups, X is an acid residue, $n$ is selected from the group consisting of nought and one, $x$ is selected from the group consisting of 0, 1, 2 and 3 and $D_1$, $D_2$ and $D_3$ are residues of heterocyclic nitrogen nuclei of the type used in cyanine dyes.

7. A dystuff of the formula:

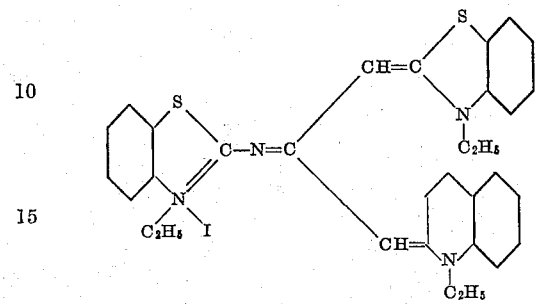

8. A dystuff of the formula:

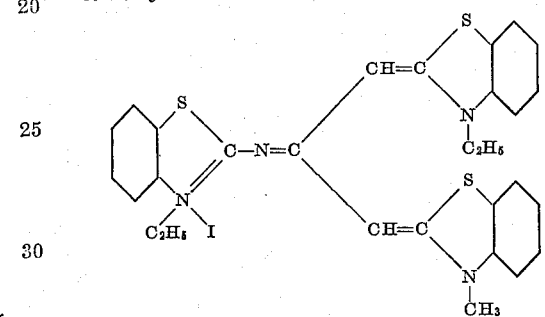

JOHN DAVID KENDALL.
DOUGLAS JAMES FRY.

CERTIFICATE OF CORRECTION.

Patent No. 2,355,654. August 15, 1944.

JOHN DAVID KENDALL, ET AL.

It is hereby certified that error appears in the printed specification of the above numbered patent requiring correction as follows: Page 4, second column, lines 44 and 52, claim 3, for that portion of the formula reading "$(CH-CH)_n-C$" read $--(CH-CH)_n=C--$; and that the said Letters Patent should be read with this correction therein that the same may conform to the record of the case in the Patent Office.

Signed and sealed this 24th day of October, A. D. 1944.

Leslie Frazer (Seal) Acting Commissioner of Patents.